United States Patent
Fan et al.

(10) Patent No.: US 9,336,734 B2
(45) Date of Patent: May 10, 2016

(54) DRIVING METHOD FOR POLARITY INVERSION OF DATA SIGNAL AND IMAGE DISPLAY METHOD OF LIQUID CRYSTAL PANEL

(71) Applicant: SHENZHEN CHINA STAR OPTOELECTRONICS TECHNOLOGY CO., LTD., Shenzhen, Guangdong (CN)

(72) Inventors: Yong Fan, Shenzhen (CN); Bin Fang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 58 days.

(21) Appl. No.: 14/241,810

(22) PCT Filed: Jan. 20, 2014

(86) PCT No.: PCT/CN2014/070926
§ 371 (c)(1),
(2) Date: Jun. 10, 2014

(87) PCT Pub. No.: WO2015/096241
PCT Pub. Date: Jul. 2, 2015

(65) Prior Publication Data
US 2015/0179115 A1    Jun. 25, 2015

(30) Foreign Application Priority Data
Dec. 25, 2013 (CN) .......................... 2013 1 0729105

(51) Int. Cl.
G09G 3/36 (2006.01)
H04N 13/04 (2006.01)
G09G 3/00 (2006.01)

(52) U.S. Cl.
CPC .............. *G09G 3/3614* (2013.01); *G09G 3/003* (2013.01); *H04N 13/0438* (2013.01)

(58) Field of Classification Search
CPC ... G09G 3/3614; G09G 3/003; G09G 3/3685; H04N 13/0438; H04N 13/0497
See application file for complete search history.

(56) References Cited

U.S. PATENT DOCUMENTS

| 8,743,039 B2 * | 6/2014 | Tai et al. .......................... 345/89 |
| 2005/0093806 A1 * | 5/2005 | Hosotani ......................... 345/96 |

(Continued)

FOREIGN PATENT DOCUMENTS

| CN | 101211029 A | 7/2008 |
| CN | 102036087 A | 4/2011 |
| CN | 102469337 A | 5/2012 |

*Primary Examiner* — Jonathan Horner
(74) *Attorney, Agent, or Firm* — Stein IP, LLC

(57) ABSTRACT

The present invention relates to a driving method for polarity inversion of data signals and an image displaying method of liquid crystal panel, which comprises: alternately outputting data signals of left-eye images and data signals of right-eye images, wherein periodically switching polarity of data signals, with eight frames as one period, such that in each period, the number of times that polarity of data signals of left-eye image being the same with polarity of data signals of right-eye image of the previous frame equals to the number of times that polarity of data signals of right-eye image being the same with polarity of data signals of left-eye image of the previous frame, in the meantime, in each half period, polarity of data signals between adjacent images of the same single eye are opposite. The liquid crystal display panel based on this driving method can not only eliminate 3-D image residual of shutter glasses but also improve brightness difference of the right eye from the left eye, such that it is able to greatly improve 3-D image displaying effect and has prominent practicality.

2 Claims, 2 Drawing Sheets

| Time Axis | 1st frame | 2nd frame | 3rd frame | 4th frame | 5th frame | 6th frame | 7th frame | 8th frame | 9th frame | ... Time |
|---|---|---|---|---|---|---|---|---|---|---|
| L/R | L | R | L | R | L | R | L | R | L | ... |
| Polarity | + | − | − | + | + | + | − | − | + | ... |
| Polarity | + | − | − | + | − | − | + | + | + | ... |
| Polarity | + | + | − | − | + | − | − | + | + | ... |
| Polarity | − | − | + | + | + | − | − | + | − | ... |

(56) References Cited

U.S. PATENT DOCUMENTS

| | | | |
|---|---|---|---|
| 2006/0012593 A1* | 1/2006 | Iriguchi et al. | 345/204 |
| 2008/0170024 A1* | 7/2008 | Song et al. | 345/96 |
| 2008/0170025 A1* | 7/2008 | Song et al. | 345/96 |
| 2010/0265284 A1* | 10/2010 | Satou et al. | 345/697 |
| 2011/0187705 A1* | 8/2011 | Lan et al. | 345/419 |
| 2013/0285994 A1 | 10/2013 | Masuda | 345/209 |
| 2013/0321483 A1* | 12/2013 | You et al. | 345/690 |
| 2015/0084941 A1* | 3/2015 | He | 345/209 |

* cited by examiner

| Time Axis | 1st frame | 2nd frame | 3rd frame | 4th frame | 5th frame | 6th frame | 7th frame | 8th frame | 9th frame | ... |
|---|---|---|---|---|---|---|---|---|---|---|
| L/R | L | R | L | R | L | R | L | R | L | ... |
| Polarity | + | − | − | + | + | + | − | − | + | ... |
| Polarity | + | − | − | + | − | − | + | + | + | ... |
| Polarity | + | + | − | − | + | − | − | + | + | ... |
| Polarity | − | − | + | + | + | − | − | + | − | ... |

Fig. 4

DRIVING METHOD FOR POLARITY INVERSION OF DATA SIGNAL AND IMAGE DISPLAY METHOD OF LIQUID CRYSTAL PANEL

TECHNICAL FIELD

This present invention relates to 3-D display technology, and in particular, to a driving method for polarity inversion of data signals and an image displaying method for a liquid crystal panel.

BACKGROUND OF THE PRESENT INVENTION

Compared with traditional 2-D flat panel display technology, 3-D display technology is able to present more vivid stereoscopic images, such that it becomes one of important developing directions of current display technologies. At present, the most popular 3-D imaging technology is shutter glasses technology. The principle of this technology is to alternately turn on and turn off left-eye lens and right-eye lens of 3-D glasses in order, as shown in FIG. 1: when the right-eye lens is on, the screen outputs an image for the right eye in the same time; when the left-eye lens is on, the screen outputs an image for the left eye in the same time, and then based on view angel difference between the left and right eyes, the viewers may synthesize images from the left eye and right eye to a 3-D image with depth of field and hierarchical perception.

At present, the liquid crystal display device has become the major appliance for displaying in every industries even family entertainment due to its advantages of slim exterior, low power consumption and radiation-free. Therefore, a 3-D imaging liquid crystal display with shutter glasses technology has also become a new hot spot. The operation principle of the liquid crystal display device is to achieve image display of different grey scales by changing the rotation angle of liquid crystal molecules. If driven by direct current mode, mobile ions in the liquid crystal material may move to transparent conductive film ITO in a same direction under influence of electric field, and this polarization phenomenon may produce another electric field within the panel and thereby interfere the rotation direction of the liquid crystal molecules, such that a phenomenon of direct current residue may appear. In order to avoid effect of direct current residue on image displaying quality, alternating current drive mode is usually adopted to the liquid crystal panel. The specific implementing manner is to periodically change the voltage acting on a pixel electrode of a pixel unit by changing polarity of a data signal with image information.

An example is taken by polarity inversion driving method of single-frame image shown in FIG. 2, it is assumed that there is such a liquid crystal display device of 256 grey scales, of which transparent white screen (white screen of 255 scales) is marked as L255 and opaque dark screen (black screen of 0 scale) is marked as L0, wherein positive and negative polarity driving voltages for the white screen are 7V and 5V respectively, and positive and negative polarity driving voltages for the black screen are 1V and 11V respectively, and the common electrode voltage is 6 v. Then, variation in the voltage of a certain pixel electrode (or a sub-pixel electrode) and its voltage difference from the common electrode may be shown as TABLE 1.

TABLE 1

| Time Axis | Time | | | | | | | | | |
|---|---|---|---|---|---|---|---|---|---|---|
| | $1^{st}$ frame | $2^{nd}$ frame | $3^{rd}$ frame | $4^{th}$ frame | $5^{th}$ frame | $6^{th}$ frame | $7^{th}$ frame | $8^{th}$ frame | $9^{th}$ frame | |
| Input Signal | L255 | L0 | L255 | L0 | L255 | L0 | L255 | L0 | L255 | ... |
| L/R | L | R | L | R | L | R | L | R | L | ... |
| Polarity | + | − | + | − | + | − | + | − | + | ... |
| Voltage | 7 V | 1 V | 7 V | 1 V | 7 V | 1 V | 7 V | 1 V | 7 V | ... |
| Voltage Difference | 1 V | 5 V | 1 V | 5 V | 1 V | 5 V | 1 V | 5 V | 1 V | ... |

As shown in TABLE 1, under this situation, the voltage difference on the pixel electrode relative to the common electrode alternatively changes between 1 V and 5 V. That is, the voltage acting on liquid crystal molecules during the positive polarity driving period is 1V, while voltage acting on liquid crystal molecules during the negative polarity driving period is 5 V. Since the voltage difference acting on liquid crystal molecules between the positive and negative polarity driving periods is always present as positive and is too large to be counteracted, there would be electricity charge residue caused, similar to the direct current residue, after a long time operation, such that 3-D imaging residue may appear. In the prior art, in order to eliminate the 3-D imaging residue mentioned above, a method for polarity inversion of multi-frame images is adopted. As shown in FIG. 3, an example is taken by double-frame image polarity inversion method. In this method, because the polarity of a data signal is switched over every two frames, in one hand, it provides much more time to charge for a certain pixel electrode (or sub-pixel electrode) in the liquid crystal panel to reach a predetermined voltage level more easily. In other hand, variation in the voltage of the pixel electrode and its voltage difference from the common electrode is shown as TABLE 2.

TABLE 2

| Time Axis | Time | | | | | | | | | |
|---|---|---|---|---|---|---|---|---|---|---|
| | $1^{st}$ frame | $2^{nd}$ frame | $3^{rd}$ frame | $4^{th}$ frame | $5^{th}$ frame | $6^{th}$ frame | $7^{th}$ frame | $8^{th}$ frame | $9^{th}$ frame | |
| Input Signal | L255 | L0 | L255 | L0 | L255 | L0 | L255 | L0 | L255 | ... |
| L/R | L | R | L | R | L | R | L | R | L | ... |
| Polarity | + | + | − | − | + | + | − | − | + | ... |
| Voltage | 7 V | 1 V | 5 V | 11 V | 7 V | 1 V | 5 V | 11 V | 7 V | ... |
| Voltage Difference | 1 V | −5 V | −1 V | 5 V | 1 V | −5 V | −1 V | 5 V | 1 V | ... |

As shown in TABLE 2, under this situation, the voltage difference on the pixel electrode relative to the common electrode repeatedly switches in the cycle of 1V→−5V−1V→5V. That is, voltages acting on liquid crystal molecules during the positive polarity driving period are 1V and −5V, while voltages acting on liquid crystal molecules during the negative polarity driving period are −1V and 5V. Voltage differences on the pixel electrode from the common electrode during the positive and negative polarity driving periods counteract one another, thus the imaging residue may be avoided. However, another problem is derived in this condition, which is brightness difference between the right-eye images and the left-eye images. This phenomenon is more conspicuous for the liquid crystal panel using charge sharing technology to improve color shift. That is because that each pixel unit of the liquid crystal display panel using sharing charge technology is provided with a sharing capacitor to redistribute the charge in a main area and a sub area of the pixel electrode under the action of a control signal. The sharing capacitor has a capability to store the charge. When polarity of the charge obtained by the sharing capacitor during a new frame of image is same with the charge stored during the previous frame of image, the image is brighter because of charge accumulation; otherwise, when polarity of the charge obtained by the sharing capacitor during a new frame is opposite to the charge stored during the previous frame, the image is darker because of charge counteraction. Therefore, for the same data signal input, such as L255 shown in TABLE 3, brightness in the left-eye images is always weaker than that of the right-eye images while output by the liquid crystal display panel based on the double-frame polarity inversion method.

TABLE 3

| Time Axis | Time | | | | | | | | |
|---|---|---|---|---|---|---|---|---|---|
| | $1^{st}$ frame | $2^{nd}$ frame | $3^{rd}$ frame | $4^{th}$ frame | $5^{th}$ frame | $6^{th}$ frame | $7^{th}$ frame | $8^{th}$ frame | $9^{th}$ frame |
| Input Signal | L255 | L255 | L255 | L255 | L255 | L255 | L255 | L255 | L255 | ... |
| L/R | L | R | L | R | L | R | L | R | L | ... |
| Polarity | + | + | − | − | + | + | − | − | + | ... |
| Brightness | Dark | light | Dark | light | Dark | light | Dark | light | Dark | light |

To solve the problem mentioned above, with numbers of repeated experiments and years of research and designing in 3-D imaging technology for liquid crystal display panels, the inventor of this present invention proposes a new driving method for polarity inversion of data signals and a corresponding image displaying method for the liquid crystal panel, which are not only able to eliminate 3-D imaging residue but also improve lightness difference between the right-eye images and the left-eye images.

SUMMARY OF THE PRESENT INVENTION

Therefore, the objective of the present invention is to provide a driving method for polarity inversion of data signals and an image displaying method of a liquid crystal panel, which are not only able to eliminate 3-D imaging residue but also improve lightness difference between right-eye images and left-eye images. Thus, those methods have prominent value in practice.

The present invention provides a driving method for polarity inversion of data signal, comprising alternately outputting data signals of left-eye images and data signals of right-eye images, wherein polarity of data signal, with eight frames as one period, is periodically switched, such that in each period, the number of times that polarity of data signals of the left-eye image being the same with polarity of data signals of the right-eye image of the previous frame equals to the number of times that polarity of data signals of the right-eye image being the same with polarity of data signals of the left-eye image of the previous frame, and in each half period, polarity of data signals between adjacent images of the same single eye are opposite to each other.

According embodiments of the present invention, in each period, data signals of images of the first, fourth, fifth and sixth frames are of positive polarity, while data signals of images of the second, third, seventh and eighth frames are of negative polarity.

According embodiments of the present invention, in each period, data signals of images of the first, fourth, seventh and eighth frames are of positive polarity, while data signals of images of the second, third, fifth and sixth frames are of negative polarity.

According embodiments of the present invention, in each period, data signals of images of the first, second, fifth and eighth frames are with positive polarity, while data signals of images of the third, fourth, sixth and seventh frames are with negative polarity.

According embodiments of the present invention, in each period, data signals of images of the first, second, sixth and seventh frames are of negative polarity, while data signals of images of the third, fourth, fifth and eighth frames are of positive polarity.

In addition, this present invention provides an image displaying method of liquid crystal panel, comprising the steps of: alternately outputting data signals of left-eye images and data signals of right-eye images, wherein polarity of data signals, with eight frames as one period, is periodically switched, such that in each period, the number of times that polarity of data signals of the left-eye image being the same with polarity of data signals of the right-eye image of the previous frame equals to the number of times that polarity of data signals of the right-eye image being the same with polarity of data signals of the left-eye image of the previous frame, and in each half period, polarity of data signals between adjacent images of the same single eye are opposite to each other; outputting the left-eye images based on data signals of odd-numbered frames; and outputting the right-eye images based on data signals of even-numbered frames.

According embodiments of the present invention, in each period, data signals of images of the first, fourth, fifth and sixth frames are of positive polarity, while data signals of images of the second, third, seventh and eighth frames are of negative polarity.

According embodiments of the present invention, in each period, data signals of images of the first, fourth, seventh and eighth frames are of positive polarity, while data signals of images of the second, third, fifth and sixth frames are of negative polarity.

According embodiments of the present invention, in each period, data signals of images of the first, second, fifth and eighth frames are of positive polarity, while data signals of images of the third, fourth, sixth and seventh frames are of negative polarity.

According embodiments of the present invention, in each period, data signals of images of the first, second, sixth and seventh frames are of negative polarity, while data signals of images of the third, fourth, fifth and eighth frames are of positive polarity.

In particularly, the left-eye or right-eye image of each frame may be output in a pattern of dot inversion.

In particularly, the left-eye or right-eye image of each frame may be output in a pattern of line inversion.

Other features and advantages of the present invention will be set forth in the following specifications, and part of these will be more apparent from the specifications, or may be understood by implementing the invention. Other objectives and advantages of the present invention may be achieved and obtained based on structure specified in the description, patent claims and drawings.

DESCRIPTION OF THE DRAWINGS

The drawings provide further understanding for the present invention, and constitute a part of the specification for interpreting the present invention together with the embodiments thereof, but not limit to the present invention, wherein:

FIG. 4 is a diagram of polarity inversion of data signals in a liquid crystal display panel of the present invention.

DETAILED DESCRIPTION

Figure 1:
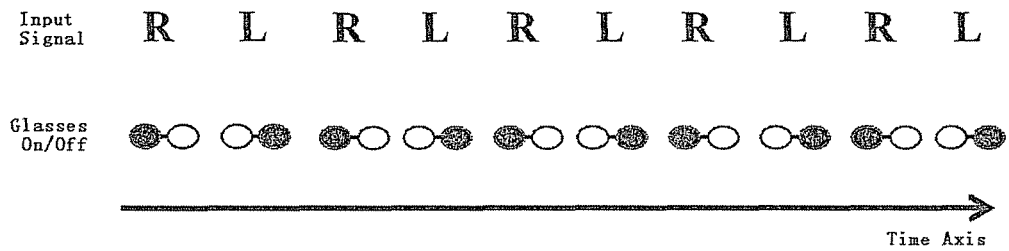
FIG. 1 is a diagram of shutter glasses in the prior art with left lens and right lens of alternately turning on and turning off in order.
Figure 2:
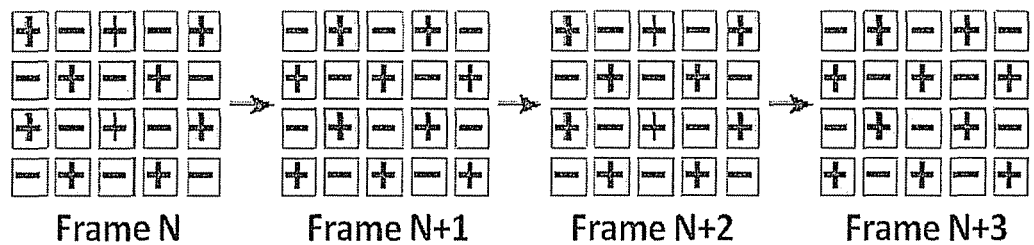
FIG. 2 is diagram of polarity inversion of single-frame image of a liquid crystal display panel in the prior art.
Figure 3:
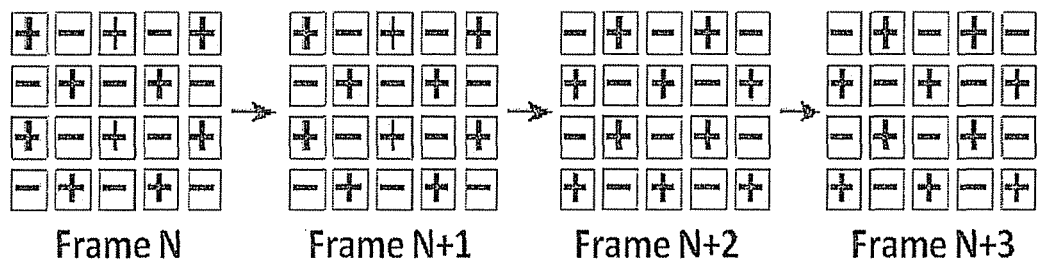
FIG. 3 is a diagram of polarity inversion of double-frame image of the liquid crystal display panel in the prior art.

To achieve objectives above, the present invention proposes a data signal driving method different from those in the prior art, that is, polarity of data signals in a liquid crystal panel is changed a periodically. The driving method comprises the step of alternately outputting data signals of the left-eye images and data signals of the right-eye images, wherein polarity of data signals, with eight frame images as one period, is periodically switched such that in each period, the number of times that data signal polarity of left-eye image being the same with data signal polarity of right-eye image of the previous frame equals to the number of times that data signal polarity of right-eye image being the same with data signal polarity of left-eye image of the previous frame, and in the meantime, in each half period, polarity of data signals between adjacent images of the same single eye are opposite.

Referring to the prior art, a liquid crystal display device working with shutter glasses needs to output the left-eye images and the right-eye images in turn, and during every frame of single-eye image, polarity of one data signal maintains a certain polarity of positive or negative. According to the driving method in the present invention, in a certain period, switching status and polarity states for polarity of data signals in the liquid crystal panel may be present as one of the four conditions shown in FIG. 4 (also shown in TABLE 4 below).

TABLE 4

| Time Axis | Time | | | | | | | | |
|---|---|---|---|---|---|---|---|---|---|
| | $1^{st}$ frame | $2^{nd}$ frame | $3^{rd}$ frame | $4^{th}$ frame | $5^{th}$ frame | $6^{th}$ frame | $7^{th}$ frame | $8^{th}$ frame | $9^{th}$ frame |
| L/R | L | R | L | R | L | R | L | R | L ... |
| Polarity | + | − | − | + | + | + | − | − | + ... |
| Polarity | + | − | − | + | − | − | + | + | + ... |
| Polarity | + | + | − | − | + | − | − | + | + ... |
| Polarity | − | − | + | + | + | − | − | + | − ... |

The four conditions mentioned above may be seen as repeated implementation from a polarity inversion pattern "+−−+++−−". However, there is one condition that has to be met, i.e., in every half period, polarity of data signals between two adjacent left-eye images must be opposite, and polarity of data signals between two adjacent right-eye images must be also opposite. Therefore, the operation principle of the polarity inversion pattern "+−−+++−−" will be discussed below in conjunction with detailed embodiments. By means of this, it may be completely understand how the technical means is used in the present invention to solve the technical problems and achieve the technical effects, and accordingly implement the present invention. It should be noted that respective embodiments and respective features of each embodiment of the present invention can be combined with each other as long as no conflict caused, and the technological solutions come along are covered by the protect scope of the present invention.

An example is still taken by the liquid crystal display device of 256 grey scales mentioned in the background. The white screen shown as transparent (white screen of 255 scales) is marked as L255, and the dark screen shown as opaque (black screen of 0 scale) is marked as L0. The positive and negative polarity driving voltages for the white screen are 7V and 5V, the positive and negative polarity driving voltages for the black screen are 1V and 11V, and the common electrode voltage is 6 v. In two continuous periods, polarities of data signals in the liquid crystal display panel are switched as shown in Table 5.

TABLE 5

| Time Axis | 1st frame | 2nd frame | 3rd frame | 4th frame | 5th frame | 6th frame | 7th frame | 8th frame | 9th frame | 10th frame | 11th frame | 12th frame | 13th frame | 14th frame | 15th frame | 16th frame |
|---|---|---|---|---|---|---|---|---|---|---|---|---|---|---|---|---|
| Input Signal | L255 | L0 | L255 | L0 | L255 | L0 | L255 | L0 | L255 | L0 | L255 | L0 | L255 | L0 | L255 | L0 |
| L/R | L | R | L | R | L | R | L | R | L | R | L | R | L | R | L | R |
| Polarity | + | − | − | + | + | + | − | − | + | − | − | + | + | + | − | − |

In the first half period:
voltage of data signal of a first frame is a positive polarity driving voltage of the white screen, which is 7V;
voltage of data signal of a second frame is a negative polarity driving voltage of the black screen, which 11V;
voltage of data signal of a third frame is a negative polarity driving voltage of the white screen, which is 5V; and
voltage of data signal of a fourth frame is a positive polarity driving voltage of the black screen, which 1V;
and, in the second half period:
voltage of data signal of the first frame is a positive polarity driving voltage of the white screen, which is 7V;
voltage of data signal of the second frame is a positive polarity driving voltage of the black screen, which 1V;
voltage of data signal of the third frame is a negative polarity driving voltage of the white screen, which is 5V;
voltage of data signal of the fourth frame is a negative polarity driving voltage of the black screen, which 11V;
... and so on.

As mentioned above, in this condition, voltage difference on the pixel electrode relative to the common electrode repeatedly switches in the cycle of 1V→5V→−1V→−5V→1V→−5V→−1V→5V. It can be seen that voltages acting on liquid crystal molecules during the positive polarity driving period are 1V and −5V, while voltages acting on liquid crystal molecules during the negative polarity driving period are −1V and 5V. Voltage difference on the pixel electrode relative to the common electrode is counteracted with each other between the positive and negative polarity driving periods. Therefore, same with the driving method for polarity inversion of multi-frame images introduced in the background, 3-D imaging residue may also be avoided in the present invention, and it thereby can greatly improve image displaying quality of the 3-D liquid crystal display device.

In another aspect of the present invention, as mentioned above, due to the charge storing capability of the sharing capacitor, when polarity of data signal of a new frame of image is different from that of the previous one, the image may be darker because of charge counteraction; otherwise, when polarity of data signal of a new frame of image is same with that of the previous frame, the image may be brighter because of charge accumulation. Thus, referring to the polarity switching manner of data signals mentioned above, brightness of images output by the liquid crystal display panel is shown as TABLE 6 below:

In this case, the polarity of data signal of a first frame is positive, which is opposite to the polarity of data signal (which is negative) of a eighth frame in the last period, and thus the image of the first frame is darker;
the polarity of data signal of a second frame is negative, which is opposite to the polarity of data signal of the first one, and thus the image of the second frame is darker;
the polarity of data signal of a third frame is negative, which is same with the polarity of data signal of he second frame, and thus the image of the third frame is brighter;
the polarity of data signal of a fourth frame is positive, which is opposite to polarity of data signal of the third frame, and thus the image of the fourth frame is darker;
the polarity of data signal of a fifth frame is positive, which is same with the polarity of data signal of the fourth frame, and thus the image of the fifth frame is brighter;
the polarity of data signal of a sixth frame is positive, which is same with the polarity of data signal of the fifth frame, and thus the image of the sixth frame is brighter;
the polarity of data signal of a seventh frame is negative, which is opposite to the polarity of data signal of the sixth frame, and thus the image of the seventh frame is darker; and
the polarity of data signal of an eighth frame is negative, which is same with the polarity of data signal of the seventh frame, and thus the image of the eighth frame is brighter.

Thus, it can be seen that, in one period, the number of frames with the left-eye images brighter is consistent with the number of frames with the right-eye images brighter, and the number of frames with the left-eye images darker is also consistent with the number of frames with the right-eye images darker. Since overall brightness is the integral of time, an image felt by the left eye is the cumulative result of these four frames of left-eye images, and also an image felt by the right eye is the cumulative result of these four frames of right-eye images. Thereby, the brightness difference of left-eye images from right-eye images in the prior art is improved.

In the present invention, the left-eye images may be output based on the data signals of odd-numbered frames, and the right-eye images may be output based on the data signals of even-numbered frames. The left-eye or right-eye image in each frame may be output in a pattern of dot inversion or line inversion. However, various arrangement patterns for polarity of data signals in one frame all can be used as embodiments of the present invention.

TABLE 6

| Time Axis | 1st frame | 2nd frame | 3rd frame | 4th frame | 5th frame | 6th frame | 7th frame | 8th frame | 9th frame | 10th frame | 11th frame | 12th frame | 13th frame | 14th frame | 15th frame | 16th frame |
|---|---|---|---|---|---|---|---|---|---|---|---|---|---|---|---|---|
| Input Signal | L255 | L255 | L255 | L255 | L255 | L255 | L255 | L255 | L255 | L255 | L255 | L255 | L255 | L255 | L255 | L255 |
| L/R | L | R | L | R | L | R | L | R | L | R | L | R | L | R | L | R |
| Polarity | + | − | − | + | + | + | − | − | + | − | − | + | + | + | − | − |
| Brightness | Dark | Dark | light | Dark | light | light | Dark | light | Dark | Dark | light | Dark | light | light | Dark | light |

Although embodiments are presented as above, the foregoing content is merely used for explanation of the invention but not to limit thereto. Any modifications and variations in implementing manner and details can be made by person skilled in the art within the spirit and scope of the present invention. Therefore the protection scope of the present invention should be subjected to the scope defined by the patent claims.

The invention claimed is:

1. A driving method for polarity inversion of data signals, comprising alternately outputting data signals of left-eye images and data signals of right-eye images, wherein polarity of data signals, with eight frames as one period, is periodically switched, such that in each period, the number of times that polarity of data signals of the left-eye image being the same with polarity of data signals of the right-eye image of the previous frame equals to the number of times that polarity of data signals of the right-eye image being the same with polarity of data signals of the left-eye image of the previous frame, and in each half period, polarity of data signals between adjacent images of the same single eye are opposite to each other, wherein in each period, data signals of images of the first, fourth, fifth and sixth frames are of positive polarity, while data signals of images of the second, third, seventh and eighth frames are of negative polarity, and voltage difference on the pixel electrode relative to the common electrode repeatedly switches in the cycle of 1V→5V→-1V→-5V→1V→-5V→-1V→5V→.

2. An image displaying method of liquid crystal panel, comprising the following steps:

alternately outputting data signals of left-eye images and data signals of right-eye images, wherein polarity of data signals, with eight frames as one period, is periodically switched, such that in each period, the number of times that polarity of data signals of the left-eye image being the same with polarity of data signals of the right-eye image of the previous frame equals to the number of times that polarity of data signals of the right-eye image being the same with polarity of data signals of the left-eye image of the previous frame, and in each half period, polarity of data signals between adjacent images of the same single eye are opposite to each other, wherein in each period, data signals of images of the first, fourth, fifth and sixth frames are of positive polarity, while data signals of images of the second, third, seventh and eighth frames are of negative polarity, and voltage difference on the pixel electrode relative to the common electrode repeatedly switches in the cycle of 1V→5V–1V→-5V→1V→-5V→-1V→5V;

outputting the left eye images based on data signals of odd-numbered frames; and outputting the right eye images based on data signals of even-numbered frames.

* * * * *